United States Patent
Kuribara

(10) Patent No.: US 7,023,116 B2
(45) Date of Patent: Apr. 4, 2006

(54) SMALL BRUSHLESS MOTOR

(75) Inventor: Kazumi Kuribara, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 191 days.

(21) Appl. No.: 10/766,579

(22) Filed: Jan. 27, 2004

(65) Prior Publication Data

US 2004/0189113 A1 Sep. 30, 2004

(30) Foreign Application Priority Data

Jan. 29, 2003 (JP) .............................. 2003-019597

(51) Int. Cl.
*H02K 5/16* (2006.01)

(52) U.S. Cl. ............................ 310/90; 310/91; 310/43; 310/67 R; 360/99.08; 360/99.04; 360/99.07; 384/107; 384/114

(58) Field of Classification Search ................. 310/90, 310/91, 43, 67 R; 360/99.08, 99.04, 99.07; 384/100, 107, 114
See application file for complete search history.

(56) References Cited

U.S. PATENT DOCUMENTS

| | | | | |
|---|---|---|---|---|
| 4,540,906 A * | 9/1985 | Blom | ........................... | 29/596 |
| 5,610,462 A * | 3/1997 | Takahashi | ..................... | 310/90 |
| 6,242,830 B1 * | 6/2001 | Katagiri | ........................ | 310/90 |
| 6,271,611 B1 * | 8/2001 | Taniguchi et al. | ............. | 310/90 |
| 6,380,651 B1 * | 4/2002 | Yamaguchi et al. | .......... | 310/90 |
| 6,617,736 B1 * | 9/2003 | Horng et al. | .................. | 310/90 |
| 6,661,131 B1 * | 12/2003 | Fukutani | ...................... | 310/90 |
| 6,897,586 B1 * | 5/2005 | Horng et al. | .................. | 310/90 |
| 2005/0140220 A1 * | 6/2005 | Tsuda et al. | ................... | 310/90 |
| 2005/0243461 A1 * | 11/2005 | Kitamura et al. | ......... | 360/99.08 |

* cited by examiner

Primary Examiner—Darren Schuberg
Assistant Examiner—Yahveh Comas
(74) Attorney, Agent, or Firm—Jordan and Hamburg LLP

(57) ABSTRACT

A brushless motor includes a highly reliable thrust-receiving member that simplifies the machining and assembling of parts and prevents deformation of the bearing and leakage of lubricating oil. A stator base has a cylindrical portion serving as a base portion of a bearing housing of the motor. The cylindrical portion is integral with the stator base. A sleeve bearing is pressed in and mounted in a fixed condition on the inner side of the cylindrical portion. A stator core consisting of a conductive wire is mounted in a fixed condition on the outer side of the cylindrical portion, thereby forming a stator. A thrust-receiving portion for the rotary shaft is molded integrally with the stator base at the opening of the cylindrical portion by outsert and resin integral molding, this thrust-receiving portion serving to receive the end of the rotary shaft opposite to the output end thereof.

2 Claims, 6 Drawing Sheets

SMALL BRUSHLESS MOTOR

BACKGROUND OF THE INVENTION

1. Field of the Invention

The present invention relates to a small brushless motor for recording-reproducing devices using, for example, disk media.

2. Description of the Related Art

In the conventional bearing housing structures for supporting the bearing member of a small brushless motor, a roughly central part of a stator base composed of a thin sheet of a ferrous metal material such as an iron sheet or a non-ferrous metal material such as aluminum was subjected to hole flanging and a bearing housing was formed integrally with the stator base from the same work as the stator base.

In such a bearing housing structure, the hole flange base portion had to be sealed by forming a bottom with a thrust-receiving member that supported the end of the rotary shaft of the motor on the side opposite to that of loading, held it so as to prevent a lubricating oil from leaking from the bearing, and was composed of a material other than the stator base.

The following is known about the conventional technology relating to the shape of the thrust-receiving member and methods for fixing such a member.

(1) The aforesaid receiving member is formed to have a plate-like shape and is secured with screws to the stator core via a flat part of a step portion provided on the periphery of the bearing housing of the stator base (for example, Japanese Patent Application Laid-open No. H9-103043).

(2) The aforesaid receiving member is formed by pressing or cutting as a cup-like metal ring member which is pressed in the hole flange base portion of the stator base (for example, Japanese Patent Application Laid-open No. H8-289523).

(3) The aforesaid receiving member is formed to have a disk-like shape and is fitted into a recess in the lower end portion of the bearing and caulked (for example, Japanese Patent Application Laid-open No. H8-275439).

(4) The aforesaid receiving member is formed to have a disk-like shape and is welded or adhesively bonded in the vicinity of the aforesaid opening so as to close the hole flange base portion of the stator base (for example, Japanese Patent Application Laid-open No. H8-214487).

However, the following problems are associated with the above-described conventional technology.

Namely, with the technology of (1), metal chips are produced during tapping or during a screwing operation involving tapping and there is a risk of those metal chips penetrating into the bearing. Furthermore, the operability of threading and screwing is poor and there is a risk of the lubricating oil leaking from the seams.

With the technology of (2), there is a risk of the metal ring member falling out or detaching, a spread of dimensions in the thrust direction can easily occur, and the rotor can be brought into contact with the bearing portions, which will make the rotation thereof impossible.

With the technology of (3), because the end portion of the bearing is directly caulked, the inner diameter of the bearing can be changed, the caulked portion can become loose or detached, and the lubricating oil can leak out.

With the technology of (4), there is the danger of the workability of the welding and adhesion being poor, and of the welded portion and adhered portion peeling off or pin holes forming thereon, making the lubricating oil leak out.

SUMMARY OF THE INVENTION

It is an object of the present invention to resolve the aforesaid problems and to provide a small brushless motor comprising a member for receiving the thrust of a rotary shaft, which allows the machining of parts and the assembling of the parts to be conducted effectively, has a high strength and rigidity preventing it from falling off hand detaching even when the motor falls down or is subjected to impacts, prevents the bearing from deformation and the lubricating oil from leaking, and has a long service life and excellent reliability.

The above-described problems can be resolved and the aforesaid object can be attained with a small brushless motor in which a cylindrical portion is formed integrally and a bearing housing is obtained by conducting hole flanging of a stator base composed of a metal sheet, the motor comprising a bearing for rotatably supporting a rotary shaft of a rotor mounted on the inner side of the bearing housing, a stator core mounted in a fixed condition on the outside of the bearing housing, a magnet comprising a plurality of magnetic poles arranged to face the stator core, and a rotor yoke having the magnet mounted thereon in a fixed condition and having the shaft disposed in the center thereof, wherein integrally molding the outer peripheral portion of the bearing housing and the opening of the cylindrical portion formed by hole flanging of the bearing housing from a resin closes the opening, thereby providing it with a bottom and forming a portion for receiving the thrust of the rotary shaft, and the stator core is mounted in a fixed condition on the bearing housing via a resin covering the outer periphery of the bearing housing.

Alternatively, a small brushless motor is provided in which a cylindrical portion is formed integrally and a bearing housing is obtained by conducting hole flanging of a stator base composed of a metal sheet, the motor comprising a bearing for rotatably supporting a rotary shaft of a rotor mounted on the inner side of the bearing housing, a stator core mounted in a fixed condition on the outside of the bearing housing, a magnet comprising a plurality of magnetic poles arranged to face the stator core, a rotor yoke having the magnet mounted thereon in a fixed condition and having the shaft disposed in the center thereof, and a circuit substrate having mounted thereon a circuit for driving and controlling, this circuit being arranged outward of the stator base on the side of the bearing housing, wherein integrally molding the outer peripheral portion of the bearing housing and the opening of the cylindrical portion formed by hole flanging of the bearing housing from a resin closes the opening, thereby providing it with a bottom and forming a portion for receiving a thrust of the rotary shaft, and the stator core is mounted in a fixed condition on the bearing housing via a resin covering the outer periphery of the bearing housing.

Furthermore, the problems associated with the machining of parts and the assembling of the parts can be resolved by forming a positioning and locking portion for the stator core, which is formed by molding from a resin integrally with the stator base, in the base portion of the cylindrical portion of the stator base, or by forming a positioning and locking portion for the circuit substrate and the stator core, which is formed by molding from a resin integrally with the stator base, in the base portion of the cylindrical portion of the stator base.

DESCRIPTION OF THE PREFERRED EMBODIMENTS

The preferred embodiments of the present invention will be described below with reference to the drawings.

Figure 1:
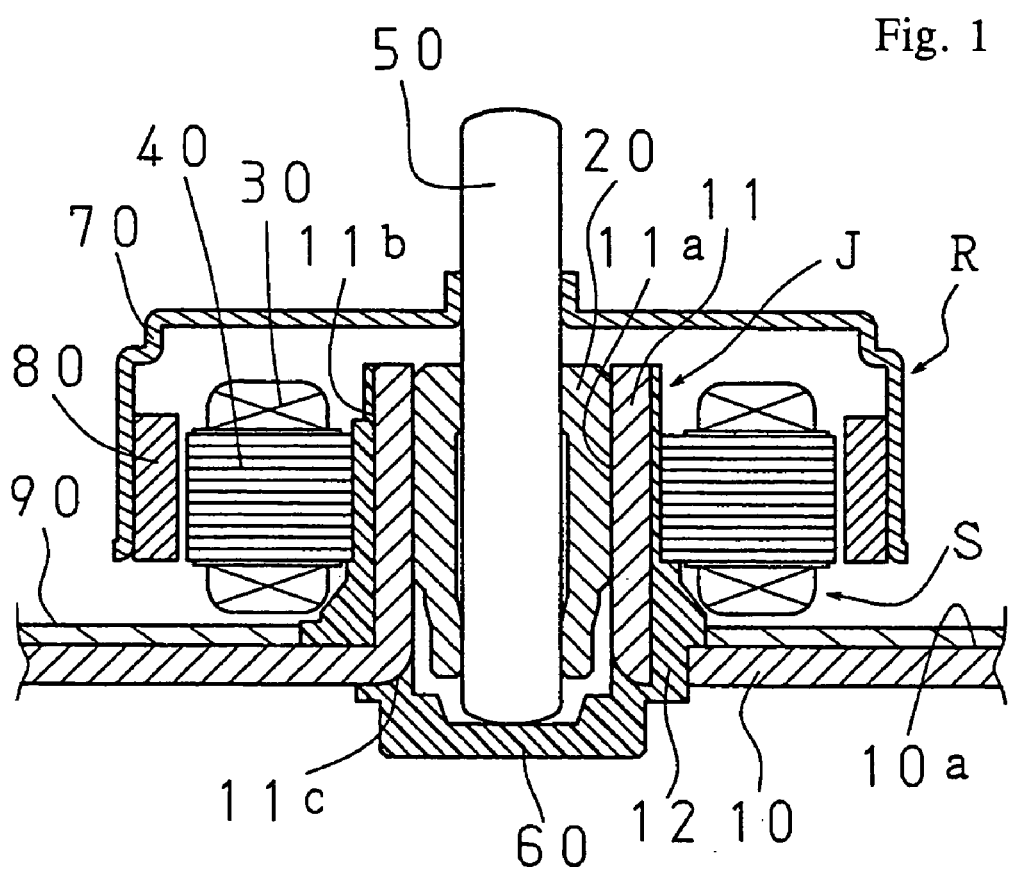
FIG. 1 is a cross-sectional front view of a small brushless motor illustrating an embodiment of the present invention.

FIG. 1 is a cross-sectional view of the motor illustrating an embodiment of the present invention.

Referring to FIG. 1, a hole flanging process is implemented with a press almost in the center of a stator base 10 composed of a metal sheet, and a cylindrical portion 11 serving as a base part of a bearing housing J of the motor is formed integrally with the stator base 10. A hole flanging process is a process in which a hole is opened up in a plate material, and a punch with a diameter larger than the hole in pushed into the hole, forming a cylinder from the edge of the hole.

A sleeve bearing 20 of a radial bearing is pressed in and mounted in a fixed condition on the inner side 11a of the cylindrical portion 11. Furthermore, a stator core 40 with a coil 30 from a copper wire wound therearound is mounted in a fixed condition on the outer side 11b of the cylindrical portion 11 to form a stator S. Further, in an opening 11c of the cylindrical portion 11 of the stator base 10, a portion 60 receiving the thrust of a rotary shaft 50 is molded integrally with the stator base 10 by a resin integral molding method such as an outsert molding method for receiving the end portion on the rotary shaft 50 on the side thereof opposite to the output side.

Furthermore, a cap-like rotor yoke 70 is mounted in a fixed condition on the rotary shaft 50 supported in the thrust-receiving portion 60 and the bearing 20 on the inner side of the cylindrical portion 11, and a drive magnet 80 having a plurality of poles arranged opposite the magnetic poles of the stator core 40 is mounted in a fixed condition on the inner peripheral surface of the rotor yoke 70, thereby constituting a rotor R.

A circuit substrate 90 composed of a printed circuit substrate is mounted in a fixed condition on the flat portion 10a on the stator base 11 on the side of the cylindrical portion 11.

Figure 2:
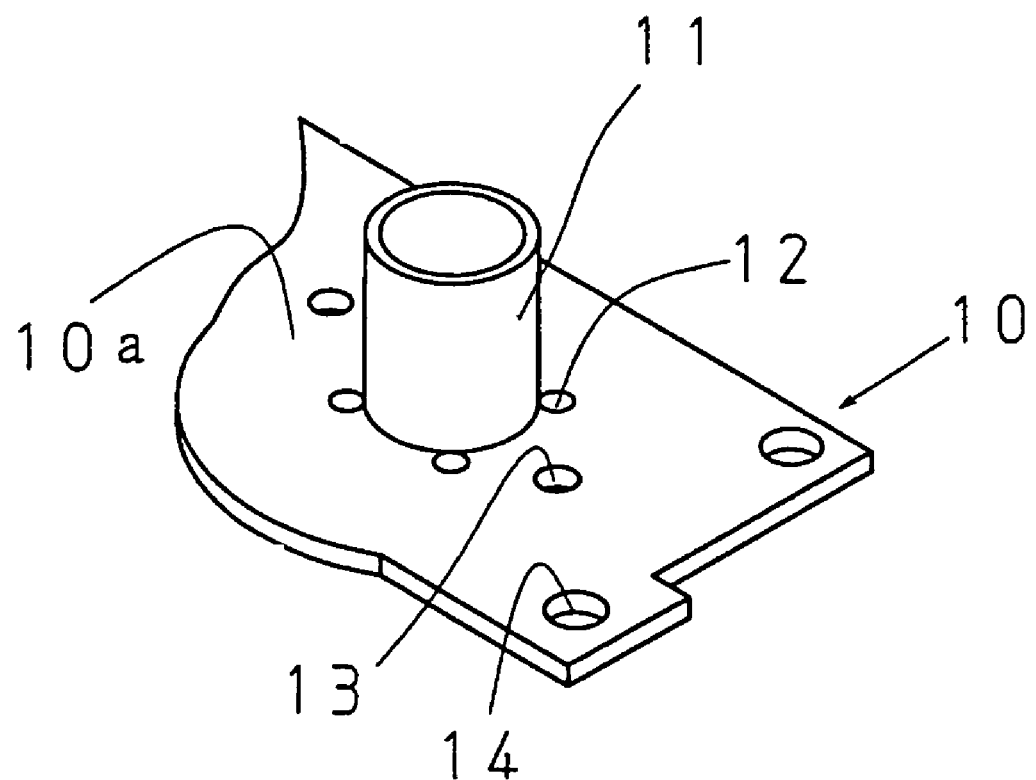
FIG. 2 is a perspective view illustrating a cylindrical portion obtained by hole flanging that is shown in FIG. 1.

FIG. 2 is a perspective view of the cylindrical portion 11 produced by hole flanging with a press that is explained with reference to FIG. 1. As shown in FIG. 2, a hole 12 is provided in at least one place in the stator base 10 in the vicinity of the base portion of the cylindrical portion 11. Furthermore, at least one mounting hole 13 for the circuit substrate 90 shown in FIG. 1 and at least one hole 14 for fixing the frame of a recording-reproducing device (not shown in the figures) are provided in the flat portion 10a of the stator base 10. Besides the iron sheet, the material of the stator base 10 may be a ferrous metal plate, or a nonferrous metal plate composed of brass or aluminum.

Figure 3:
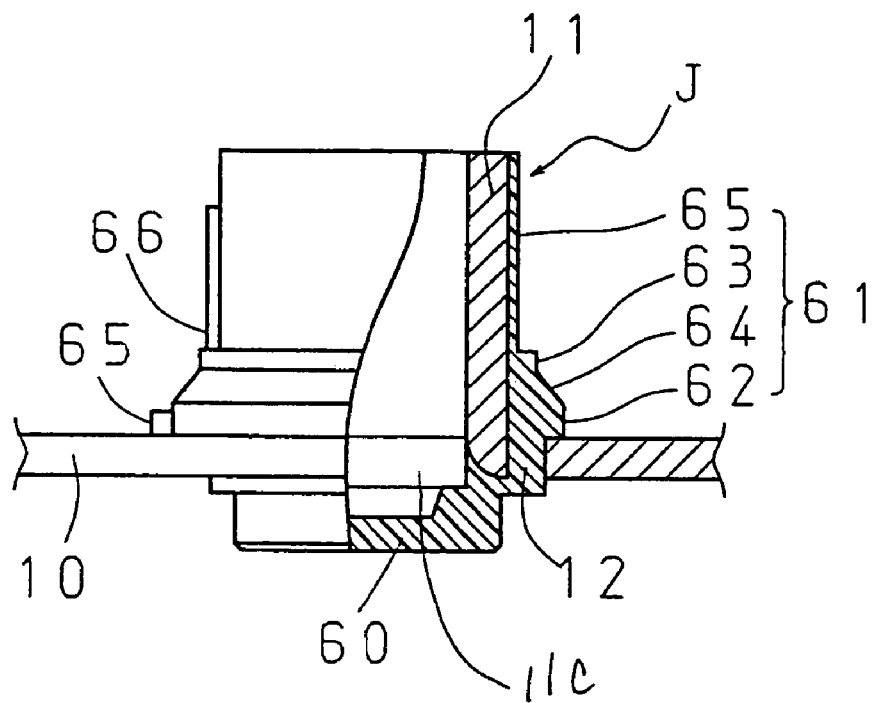
FIG. 3 is a cross-sectional view of an outsert-molded bearing housing shown in FIG. 1.

FIG. 3 is a cross-sectional view of the main part illustrating the structure of the bearing housing J shown in FIG. 1. Referring to FIG. 3, the thrust-receiving portion 60 which closes as a lid the opening 11c of the cylindrical portion 11 of the stator base 10 is formed by outsert molding. Furthermore, a step portion 61 serving for positioning and locking the stator core 40 and the circuit substrate 90 is formed integrally with the thrust-receiving portion 60 by outsert molding via the hole 12 on the base side of the cylindrical portion 11 formed by hole flanging. This step portion 61 is composed of a large-diameter portion 62 which is in contact with the surface of the stator base 10, a medium-diameter portion 63 for supporting the edge surface of the mounting hole of the stator core 40 shown in FIG. 1, a taper portion 64 connecting the large-diameter portion 62 and the medium-diameter portion 63, and also a small-diameter portion 65 provided adjacently to the medium-diameter portion 63 and serving to cover the outer periphery of the cylindrical portion 11 onto which the mounting hole of the stator core 40 shown in FIG. 1 will be fit.

Figure 4:
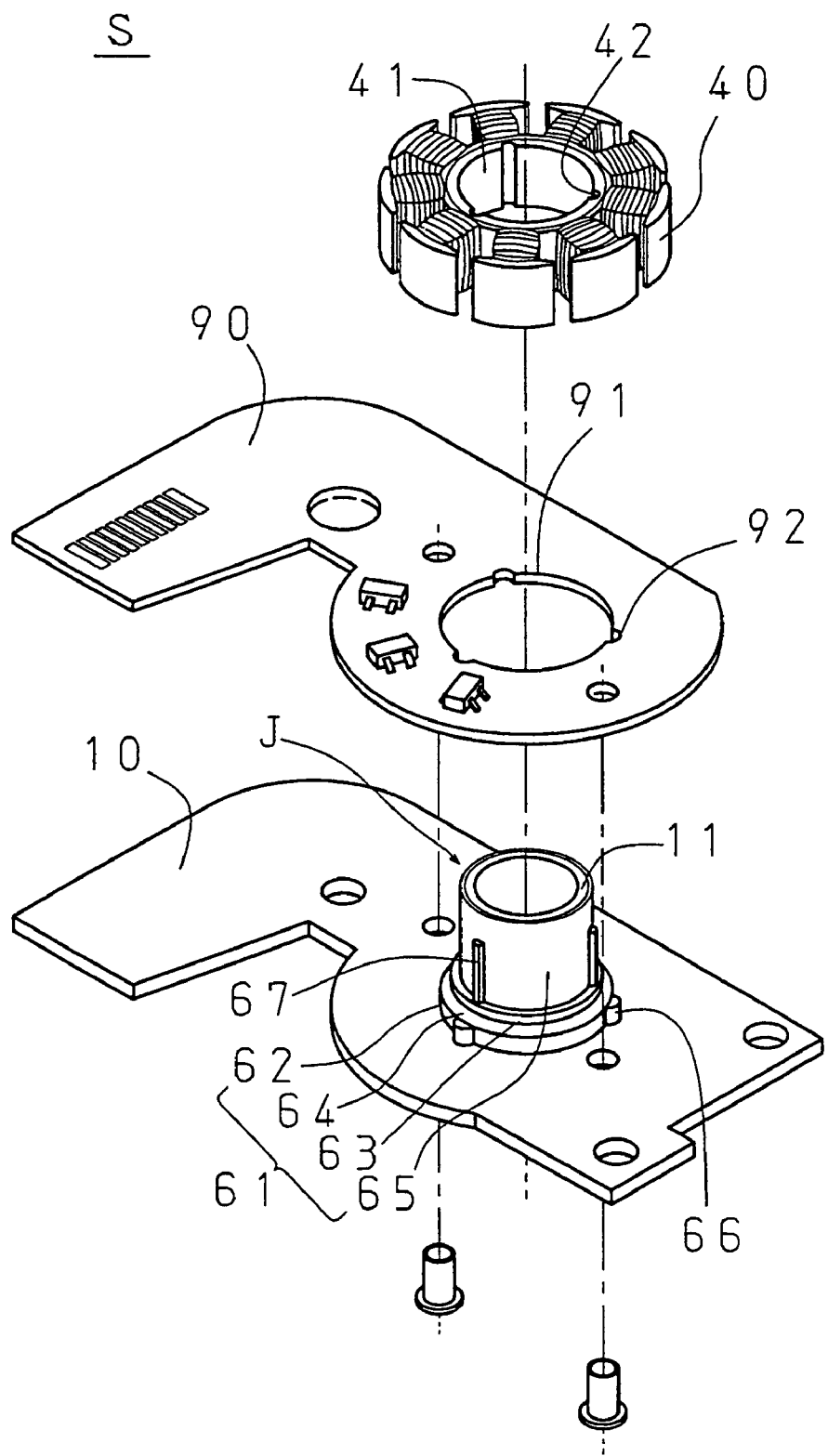
FIG. 4 is an exploded perspective view of a stator of the brushless motor shown in FIG. 1.

FIG. 4 is an exploded perspective view of the stator S of the brushless motor shown in FIG. 1. As described above, the mounting hole 91 of the circuit substrate 90 is fit onto the large-diameter portion 62, and as shown in FIG. 4, a protrusion 66 is provided in at least one place on the outer peripheral surface of the large-diameter portion 62 for positioning and locking the circuit substrate 90 that is thus fit, and a recess 92 for positioning the circuit substrate 90 in the mounting hole 91 is provided opposite the protrusion 66.

Further, the mounting hole 41 of the stator core 40 is fit on the outer periphery of the small-diameter portion 65, and a protrusion 67 is provided in at least one place on the outer peripheral surface of the small-diameter portion 65 opposite a mounting and positioning recess 42 provided in a prescribed position on the inner periphery of the mounting hole 41 of the stator core 40.

The above-described protrusions may be replaced with respective recesses, and at the same time the above-described recesses may be replaced with respective protrusions.

The cylindrical portion 11 of the bearing housing J formed by hole flanging in accordance with the present invention can have a stepless straight cylindrical shape. Therefore, the drawing process in the press forming of the stator base 10 comprising the cylindrical portion 11 can be simplified and therefore the die expenses and pressure operation cost can be reduced.

Moreover, the outsert molding of the thrust-receiving portion 60 and step portion 61 in accordance with the present invention can be conducted in a state in which those portions are connected to the strip of the work prior to cutting out the contour of the motor base 10. Therefore, the operation efficiency of machining can be further increased. Moreover, the outsert molding process can be readily included in the step of pressing the stator base 100, thereby further increasing the productivity.

Further, resin molding of the step portion 61 is conducted integrally with the thrust bearing portion 60 by casting the resin for molding via the hole 12 serving as a resin channel opening of the stator base 10 during outsert molding of the thrust bearing portion 60. As a result, the thrust-receiving portion 60 and step portion 61 are formed in a state in which they are in tight contact with the periphery of the base of the cylindrical portion 11 of the stator base 10. Furthermore, because the hole 12 is also filled the molding resin at the same time, the hole 12 can be closed almost completely, and a lubricating oil of the bearing will not leak out even if it accumulates in the bottom portion of the bearing housing J. The casting direction of the molding resin in this structure, that is, the gate location in the molding die, may be on the side of either the thrust bearing portion 60 or the step portion 61.

FIG. 2 or FIG. 3 show the hole 12 serving as a resin channel opening provided in the flat portion 10a of the stator base. However, the resin channel hole may be also provided in the base portion of the cylindrical side surface of the cylindrical portion 11. In this case, too, the resin channel hole in the cylindrical side surface of the base portion can be reliably closed by the molding resin during outsert molding, in the same manner as described above.

Further, the above-described thrust receiving portion 60 in accordance with the present invention is formed from a synthetic resin such as PPS (polyphenyl sulphide) or POM (polyacetal) with excellent low-friction slidability, heat resistance, oil resistance, weather resistance, creep resistance, mechanical strength, elasticity, rigidity and dimensional stability. Therefore, weight can be easily decreased and service life can be readily extended.

Moreover, the thrust-receiving portion 60 in accordance with the present invention can also have the functions of the back-up plate serving as an axial bearing for a rotary shaft in the conventional technology. Therefore, in accordance with the present invention, the back-up plate can be omitted.

Furthermore, the comparison of the motor in accordance with the present invention and the conventional motor having a bearing mechanism using a back-up plate (axial bearing) made from polyether ether ketone (PEEK) in the bottom part of the bearing housing composed of a metal in terms of the amount of displacement in the axial direction after a continuous endurance test conducted for 3000 h at an ambient temperature of 40° C. demonstrated that the former and latter motors had a displacement of 0.05 mm and 0.17 mm, respectively. This result shows that the motor in accordance with the present invention has an endurance which is clearly superior to that of the motor based on the conventional technology. Further, the load used in the aforesaid endurance test was in the form of a disk with a diameter of 12 cm that had an eccentricity of 3 g-mm and the revolution speed in the endurance test was 5000 rpm.

The zone of the thrust-receiving portion 60, that receives the end portion of the rotary shaft 50 can have any shape formed with a die. For example, it may have a concave shape as shown in FIG. 1. Such a shape ensures a space for the end portion of the rotary shaft 50 on the side of the thrust-receiving portion 60. Therefore, using this space makes it possible to arrange a retaining member (not shown in the figures) for the rotary shaft 50.

Further, because the step portion 61 constituting the base of the bearing housing J in accordance with the present invention is formed from a resin, the occurrence of insulation breakdown in the coil 30 is prevented even when the coil 30 is strongly pressed against the step portion 61 of the bearing housing J. Therefore, a motor of smaller thickness can be produced.

The stator core 40 is fit into the resin sleeve formed by outsert molding on the outer periphery of the cylindrical portion 11 made from a metal, that is, into the bearing housing J via a small-diameter portion 65 of the step portion 61. In such a structure, the stator core 40 can be pressed tightly and without a play in a prescribed position of the bearing housing J, without deforming the cylindrical portion 11 or the sleeve bearing 20. Furthermore, a method for ultrasound welding of resin can be used for preventing the stator core from falling out of the bearing housing J.

Because the small-diameter portion 65 made from a resin is introduced between the outer periphery of the cylindrical portion 11 and the inner periphery of the stator core 40, vibrations induced by rotation or cogging are absorbed and the rotation characteristic of the motor is thereby stabilized.

Further, as described hereinabove, because the small-diameter portion 65 made from a resin is provided, even when there is a spread in the outer diameter of the bearing housing, the resin of that portion absorbs this difference in dimensions, constant outer dimensions of the small-diameter part 65, that is, the fitting portion of the stator core 40, can be ensured, and fitting of the stator core 40 and bearing housing 11 can be conducted without a play or kicks.

Figure 5:
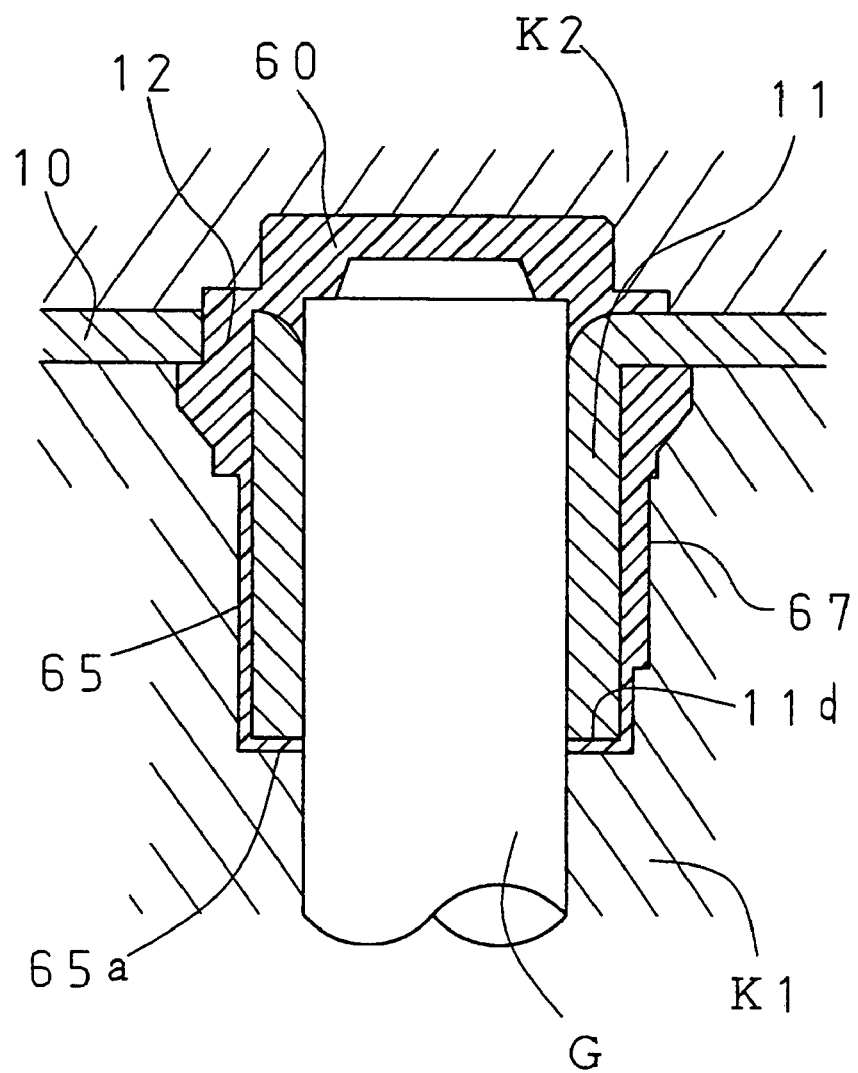
FIG. 5 is a cross sectional view of the main part illustrating the molding of the bearing housing shown in FIG. 1.

Furthermore, when there is a spread in the height of the cylindrical portion 11 produced by hole flanging, the inner diameter of the cylindrical portion 11 is selected as the molding standard, the hole flange portion, that is, the inner part of the cylindrical portion 11 is fit onto a guide pin G of the fixed side K1 of the die, as shown in FIG. 5, the stator base 10 is set on the fixed side K1 of the die, the movable side K2 of the die is tightened, and injection molding is conducted. Further, if a structure is employed such that in a state in which the stator base 10 is set on the fixed side K1 of the die, a gap is maintained between the fixed side K1 of the die and the distal end 11d of the cylindrical portion 11, and a resin portion 65a is formed by molding on the end surface of the small-diameter portion 65 of the step portion 61, then even if there is a spread in the height of the cylindrical portion 11, the difference is size can be absorbed by the resin portion 65a, the rotation characteristic of the motor can be thereby stabilized, and a bearing housing J which has no molding burrs can be obtained. In the case of a structure in which the small-diameter portion 65 is removed or formed to be shorter, as a modification example of the molding, a method can be employed by which the bearing housing is molded by selecting the outer diameter of the cylindrical portion 11 as a standard and then the inner diameter of the bearing housing is sized.

Figure 6:
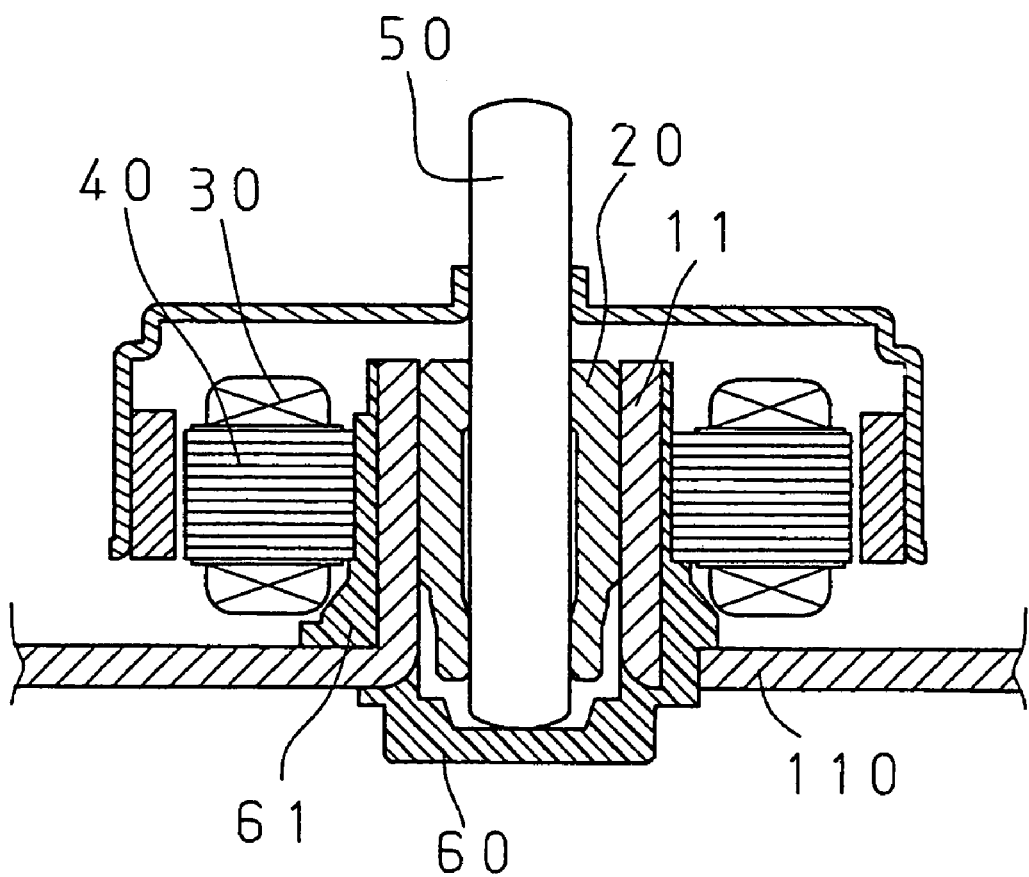
FIG. 6 is a cross-sectional front view of a motor illustrating the modification example shown in FIG. 1.

FIG. 6 illustrates the modification of the structure shown in FIG. 1. In this structure, the circuit substrate shown in FIG. 1 is omitted. In this embodiment, the stator base 110 itself may serve as an iron substrate for printing the circuit. Furthermore, a power feed terminal of the coil (not shown in the figures) may be outsert molded integrally with the stator base 110.

As described hereinabove, obtaining a bearing housing by conducting hole flanging of the stator base and forming a cylindrical portion integrally therewith, and forming a receiving portion for the rotary shaft from a resin by integrally molding (outsert molding) the hole flanging base portion of the bearing housing from a resin, this receiving portion being closed as a bottom, makes it possible to obtain the following effects.

(1) Because the thrust-receiving portion can be strongly mounted on the motor base by outsert molding, a motor can be obtained that has a rigid bearing structure which does not detach, play, fall off, or crack even when the motor is subjected to vibrations or falls down.

(2) Because the thrust-receiving portion is molded by outsert molding, a motor can be obtained which has improved reliability of the closing function of the bottom portion of the bearing housing, a long service life and high resistance to leakage of lubricating oil and the like.

(3) Because the bearing is mounted after the thrust-receiving portion has been formed, changes in the inner diameter of the bearing caused by the installation of the thrust-receiving portion in the conventional technology are prevented.

(4) Because the thrust-receiving portion is molded by outsert molding, machining of parts and assembly operation can be conducted with good efficiency. Furthermore, the number of parts can be reduced because the thrust-receiving portion obtained by outsert molding can be also used to serve as a thrust plate for receiving the end of the rotary shaft.

Furthermore, short circuiting of the coil can be reliably prevented and the prescribed positioning of the circuit substrate or stator core can be effectively conducted by providing a positioning portion for the stator core or circuit substrate and the step portion constituting the fitting portion of the stator core by resin molding integrally with the stator base at the base of the cylindrical portion constituting the bearing housing.

FIG.1
10 STATOR BASE
11 CYLINDRICAL PORTION
20 SLEEVE BEARING
30 COIL
40 STATOR CORE
50 ROTARY SHAFT
60 THRUST RECEIVING PORTION
70 ROTOR YOKE
80 MAGNET
90 CIRCUIT SUBSTRATE
J BEARING HOUSING
S STATOR
R ROTOR

What I claim is:

1. A small brushless motor comprising a stator base having a generally flat portion and a cylindrical portion extending from one side of said flat portion, said cylindrical portion being formed as a bearing housing, said cylindrical portion having an opening; a bearing for rotatably supporting a rotary shaft of a rotor mounted on said bearing housing; a stator core mounted in a fixed condition at the outside of said bearing housing; a magnet comprising a plurality of magnetic poles arranged to face said stator core; a rotor yoke having said magnet mounted thereon in a fixed condition and having the shaft disposed in the center thereof; a circuit substrate having a circuit juxtaposed to said flat portion on said one side of said flat portion; and a molded resin structure having one part disposed over said opening of said cylindrical portion for receiving the thrust of the rotary shaft and another part disposed about said cylindrical portion, said stator core being mounted in a fixed condition on said other part of said molded resin structure, wherein said other part of said molded resin structure comprises integral engagement portions, and said circuit substrate comprises engagement sections engaged by said engagement portions, said engagement portions and engagement sections preventing relative rotational movement between said molded resin structure and said circuit substrate.

2. The small brushless motor according to claim 1, wherein said other part of said molded resin structure includes a positioning and locking portion for positioning and locking said circuit substrate and said stator core on said other part of said molded resin structure.

* * * * *